(12) United States Patent
Renault

(10) Patent No.: US 9,452,845 B2
(45) Date of Patent: Sep. 27, 2016

(54) TURBOFAN NACELLE HAVING A LOCK ENGAGING WITH A MEMBER FOR LOCKING THE CLOSING THEREOF

(71) Applicant: AIRCELLE, Gonfreville l'Orcher (FR)

(72) Inventor: Cédric Renault, Montivilliers (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/704,297

(22) Filed: May 5, 2015

(65) Prior Publication Data
US 2015/0274308 A1 Oct. 1, 2015

Related U.S. Application Data

(63) Continuation of application No. PCT/FR2013/052761, filed on Nov. 18, 2013.

(30) Foreign Application Priority Data

Nov. 19, 2012 (FR) ...................... 12/60995

(51) Int. Cl.
| | | |
|---|---|---|
| *B64D 29/06* | (2006.01) | |
| *B64D 29/08* | (2006.01) | |
| *E05C 19/14* | (2006.01) | |
| *F01D 25/24* | (2006.01) | |
| *E05B 15/00* | (2006.01) | |
| *E05B 65/08* | (2006.01) | |

(52) U.S. Cl.
CPC ............... *B64D 29/08* (2013.01); *B64D 29/06* (2013.01); *E05C 19/145* (2013.01); *F01D 25/243* (2013.01); *E05B 15/0086* (2013.01); *E05B 65/0817* (2013.01)

(58) Field of Classification Search
CPC ..... B64D 29/06; B64D 29/08; F01D 25/243; F01D 25/24; F01D 25/28; F02C 7/32; F05B 2240/14; F05D 2240/14; E05C 19/12; E05C 19/14; E05C 19/145; E05B 15/0086; E05B 65/0817; Y10S 292/49
USPC ........ 415/126, 128, 213.1, 214.1; 244/129.4, 244/129.5, 53 R, 54; 292/256.69
See application file for complete search history.

(56) References Cited

U.S. PATENT DOCUMENTS

| | | | |
|---|---|---|---|
| 4,549,708 A | 10/1985 | Norris | |
| 4,679,750 A | 7/1987 | Burhans | |
| 7,461,871 B2* | 12/2008 | Vauchel | ................ E05C 19/145 292/113 |
| 2003/0151261 A1* | 8/2003 | Porte | ...................... B64D 29/06 292/229 |

FOREIGN PATENT DOCUMENTS

| | | |
|---|---|---|
| EP | 1 336 707 A1 | 8/2003 |
| FR | 996 073 A1 | 12/1951 |
| FR | 2 761 734 A1 | 10/1998 |

OTHER PUBLICATIONS

International Search Report issued Jan. 10, 2014 in International Application No. PCT/FR2013/052761.

* cited by examiner

*Primary Examiner* — Christopher Verdier
(74) *Attorney, Agent, or Firm* — Burris Law, PLLC

(57) ABSTRACT

A turbofan nacelle includes a cowl and a service structure, both being annular shapes in two halves. The cowl and the service structure are hinged on axes in respective halves to be opened during maintenance and closed during operation. In particular, a first annular half of the service structure supports a strike and a second annular half of the service structure supports a mobile bolt on a lever, such that the assembly constitutes a lock for closing the service structure. The lever engages with a locking member of a free edge of one half of the cowl, which is retracted when the lever is in the normal closed position thereof and active otherwise.

6 Claims, 6 Drawing Sheets

TURBOFAN NACELLE HAVING A LOCK ENGAGING WITH A MEMBER FOR LOCKING THE CLOSING THEREOF

CROSS-REFERENCE TO RELATED APPLICATIONS

This application is a continuation of International Application No. PCT/FR2013/052761, filed on Nov. 18, 2013, which claims the benefit of FR 12/60995, filed on Nov. 19, 2012. The disclosures of the above applications are incorporated herein by reference.

FIELD

The present disclosure relates to a turbojet engine nacelle of the type including a cowl in two halves enclosing a service structure containing services such as a thrust reverser.

BACKGROUND

The statements in this section merely provide background information related to the present disclosure and may not constitute prior art.

In a turbojet engine nacelle including a cowl with two halves, each half of the structure and the cowl is hinged on an axis which, when the turbojet engine is set up on the aircraft, is in a substantially horizontal position, aligned on the central axis of the turbojet engine, and in the upper part of the nacelle which surrounds the turbojet engine. In this position, the hinge line of the two halves of the cowl and the hinge line of the two halves of the service structure are in a so-called 12 o'clock position, whereas, when the different halves are closed because the turbojet engine is operational, they are contiguous by their respective facing edges which are then in a 6 o'clock position.

It is known to have a lock secured to the two halves of the service structure. The lock cooperates with the two facing edges of the two annular halves of the service structure in such a manner as to secure them together. Such a disposition is for example known from document FR 2 761 734. Reference will be made thereto for a description of the turbojet engine nacelle. This document describes a lock for securing the two annular halves of the service structure different from that concerned by the present disclosure.

In another state of the technique, the lock is mainly composed of a strike mounted on the edge of a first half of the service structure and a moveable bolt secured to the second half of the service structure, the moveable bolt being rotationally driven on an axis secured to the second half. As it will be displayed on FIGS. 1 to 4, on an axis secured to the second annular half of the service structure, a stick or lever carries the bolt and is operated by the maintenance operator prior to opening the service structure and prior to closing the cowl the other way around. Thus, as it will be displayed on FIGS. 1 to 4, the maintenance operator has already opened the turbojet engine nacelle, separated the two halves of the cowl by making them revolve around their hinge line in a 12 o'clock position, then the two halves of the service structure around their own hinge line in the 12 o'clock position. The maintenance operator then performs the actual maintenance operations of the turbojet engine. At the end of the latter, the maintenance operator brings the free edges of the two-halves of the service structure closer and, at their contact, handles the stick or lever on which the moveable bolt is mounted in such a manner that the bolt penetrates into the strike. The lock is in the closed state. However, to make the closing of the two halves safe, the bolt is mounted on a cam system which are profiled in such a manner as to carry out at the end of the pivoting of the stick or lever a bolting of the bolt in the strike.

The issue becomes apparent when the operator does not entirely push back the stick or lever, or even worse, if he/she ends the rotation of the stick or lever with the aid of the edge of the half-cowl when he/she is closing the latter. The nacelle may hence be considered as closed and the closing bolted while this is not the case. However, a later visual inspection reveals nothing abnormal as the lock and stick or lever thereof are masked by the closed cowl.

There is hence a serious risk for the turbojet engine.

SUMMARY

The present disclosure provides a turbojet engine nacelle of the type including a cowl containing a service structure and an actual turbojet engine, the cowl and said structure of generally annular shapes being hinged on axes in respective halves intended to be opened during maintenance and closed in operating state, a first half of said structure carrying a strike and the second half carrying a moveable bolt on a lever, in such a manner that the assembly constitutes a lock for closing the structure.

The present disclosure is characterized in that the lever cooperates with a member for locking the free edge of one half of the cowl which is retracted when the lever is in the normal closed position and active otherwise.

According to other features, the present disclosure may include the following additional features:

The locking member includes a stick aligned with the lever when the latter is in closed position of the lock and forming with it scissors intended to intercept the free edge of an annular half of the cowl in such a manner as to lock the closing movement of the latter when the lever is not in closed position of the lock;

The stick is hinged by a pivot on the lever;

One of the ends of the stick for locking the edge of the cowl carries a pivot (10) sliding in a housing of a moveable hook of the bolt hinged on the rotational axis of the lever;

The locking member includes a locking piece composed of at least one cup, hinged on an axis mounted on the lever, the cup being returned by a return spring in a retracted position along the lever when the latter is in closed position of the lock and being in a protruding position on the lever when the latter is in open position of the lock, in such a manner as to intercept the free edge of an annular half of the cowl in such a manner as to lock the closing movement of the latter when the lever is not in closed position of the lock;

The locking piece includes a symmetrical part of the cup intended to come in contact with a surface on the stationary part of the bolt secured to the annular half of the service structure, configured to receive the part and make the locking member revolve around the axis thereof in retracted or inactive position and so that the return spring of the axis be reloaded.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
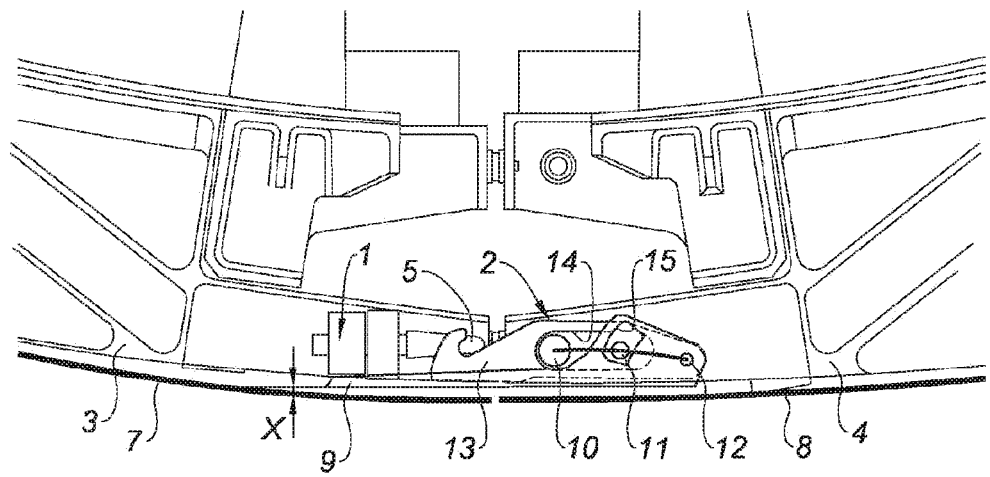
FIG. 1 is a schematic sectional view of the part of an open nacelle in a closing state thereof in which a lever cooperating with a lock is fully pushed back and a clearance between the lever and cowls of the nacelle is maintained according to the state of the technique.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a partial view of a nacelle in its lower 6 o'clock part with a lock according to the state of the technique.

As it has been described above, the nacelle includes a cowl in two annular halves 7 and 8 the free edges of which become facing when the cowl is closed in the 6 o'clock position. The service structure is also in two annular halves 3 and 4 which become facing when the structure is closed in the 6 o'clock position. The cowl as well as the service structure it contains carry hinge lines of their respective halves in the 12 o'clock position, not represented for reasons of dimension of the drawing. For a more complete description, one may refer to document FR 2 761 734.

As it has been reminded above, the facing free edges of the two annular halves 3 and 4 of the structure carry a securing lock composed of a strike 1 secured to the annular half 3 and a bolt 2 secured to the annular half 4. The bolt 2 has a hook shaped part 13 which, in closed position, is hooked around a protruding part 5 of the strike 1.

The hook shaped part 13 is hinged on a pivot 12 as well as a stick or a lever 9. The stick 9 has a housing 15 serving as cam for receiving a pivot 11 follower of the cam 15. The pivot 11 allows as it will be described by means of FIG. 2, mobilizing another pivot 10 which penetrates into a housing 14 serving as cam and which is formed on the hook shaped part 13.

As it is represented on FIG. 1, when the stick or lever 9 is completely pushed back, not only is the hook 13 in place on the protruding member 5, but, thanks to the geometry of the cams 14 and 15 and pivots 10, and 11 and 12, a bolting effect of the lever 9 is provided in such a manner that the securing of the two annular halves 3 and 4 of the service structure is maintained despite forces exerted during the operation of the nacelle and the turbojet engine thereof.

However, the closing of the cowl by its two annular halves 7 and 8 should leave a clearance X between the cowl 7, 8 and the lever 9 in such a manner as to prevent transmitting vibrations and forces in operation. Finally it is to be noted that the two free edges of the annular halves of the cowl 7 and 8 nearly entirely mask the lever 9.

Figure 2:
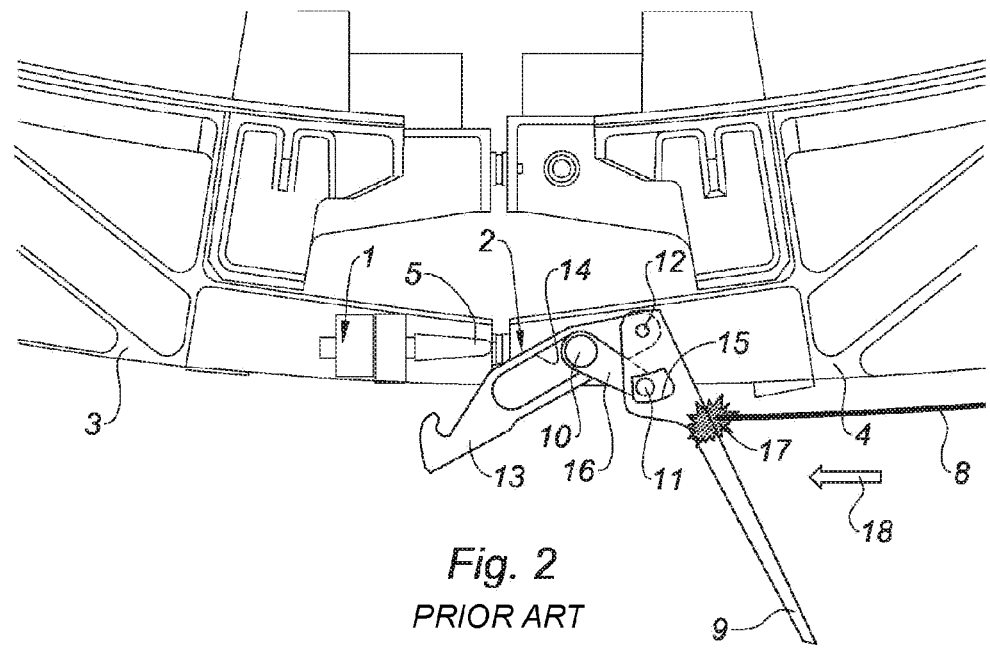
FIG. 2 is a schematic sectional view of the part of the open nacelle in an open state when one half cowl of the nacelle intercepts the lever according to the prior art.

On FIG. 2, it has been represented the lock of the state of the technique of FIG. 1, when the cowl 7, 8 is in the course of closing and the service structure 3, 4 has been closed by the maintenance operator, the latter having forgotten to operate the lever 9 for closing and bolting the lock 1, 2 as represented on FIG. 1.

If the maintenance operator closes the annular half of the cowl 8, the free edge of the latter intercepts the lever 9 in 17 according to the movement 18. Pushing back the pivot 11 into the cam 15, an intermediate stick 16 carrying the pivot 11 drives the pivot 10 which is fixed thereto. Being meshed in the housing 14 in the hook 13, the pivot 10 drives the hook 13 in rotation around the pivot 12 towards the protruding member 5 of the strike 1.

Figure 3:
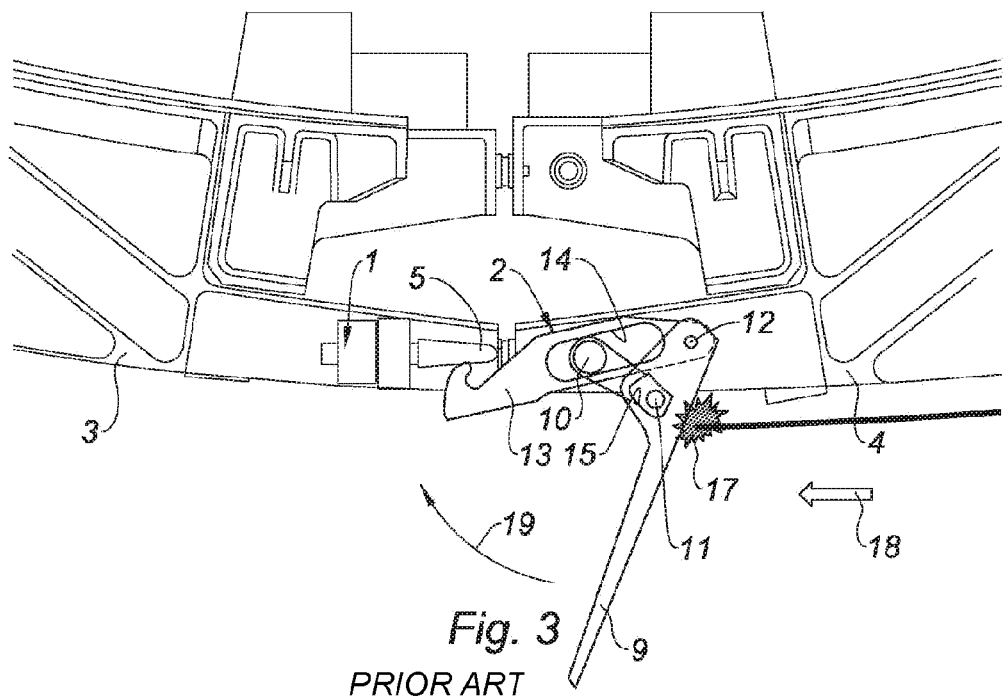
FIG. 3 is a schematic sectional view of the part of the open nacelle where the lever is driven in rotation when the half cowl pushes the lever in FIG. 2.

In the same period, on FIG. 3, the stick or lever 9 is also driven in rotation around the axis 12 according to the movement 19 when the annular half 8 pursues the closing movement 18 thereof because of the interception 17 of the free edge of 8 by the lever 9.

Figure 4:
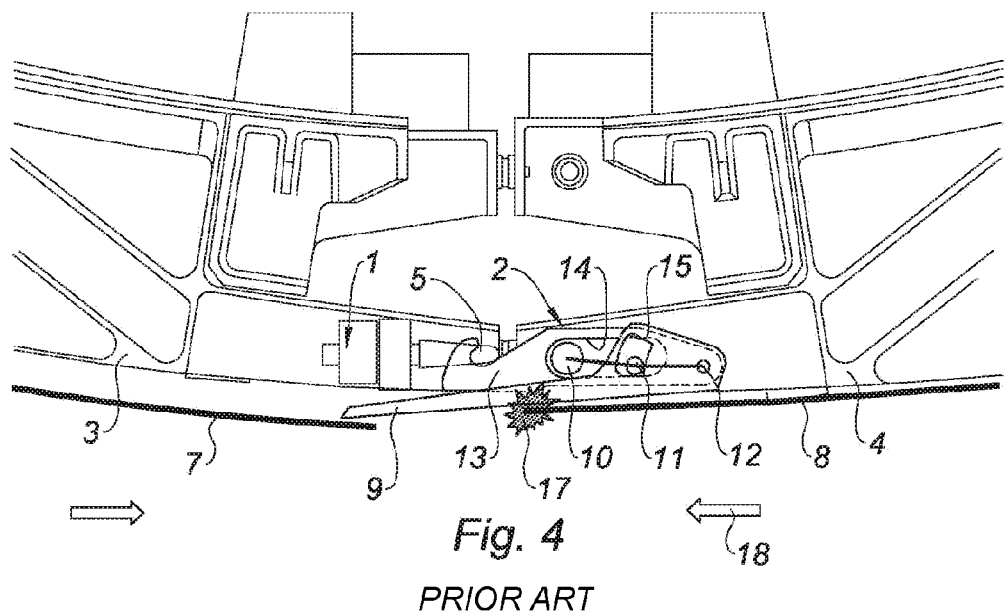
FIG. 4 is a schematic sectional view of the part of the open nacelle of which another half cowl intercepts the lever in FIG. 2.
Figure 5:
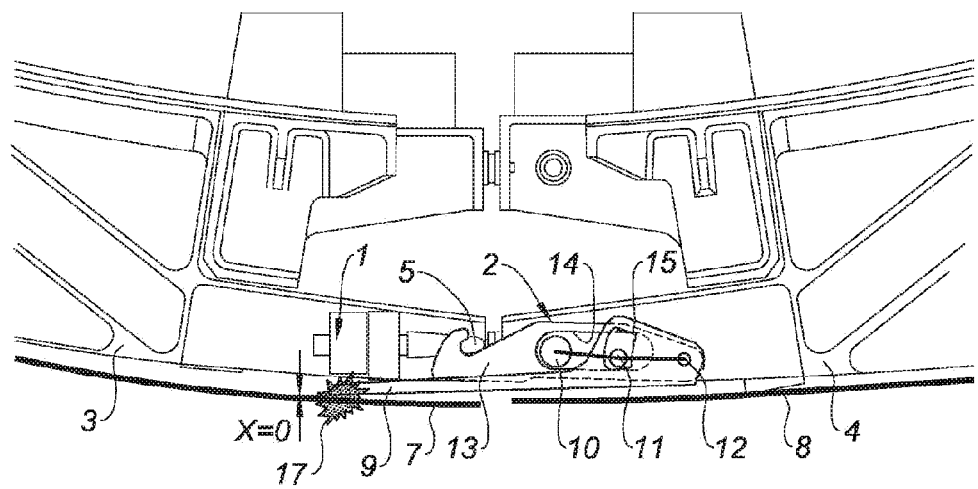
FIG. 5 is a schematic sectional view of the part of an open nacelle of which the another half cowl remains in contact with the lever in the prior art.

On FIG. 4, the maintenance operator completes the closing of the cowl by lowering the second half 7 which in turn intercepts the tip of the lever 9. Due to the computed clearance, the lever 9 remains in contact (X=0) with the annular half 7 of the cowl and has not reached the end of travel in such a manner that the stick or lever 9 has not moved beyond the bolted position provided by the disposition of the pivots 10-12 and cams 14 and 15. Hence, the situation is represented on FIG. 5.

However, the cowl being closed again, neither the maintenance operator who had neglected to operate the lever 9 himself/herself, nor a nacelle inspector can see that the lever has not been bolted. In addition, the clearance X not being retracted, the unbolted lever 9 is in contact with the annular half of the cowl 7. Hence there is a dangerous situation during the operation of the turbojet engine.

The present disclosure remedies to this defect by having a member for locking the closing movement of the one half of the cowl which is hence only possible when the locking member is retracted or rendered inactive because the lever 9 has been closed correctly in a bolted position.

Figure 6:
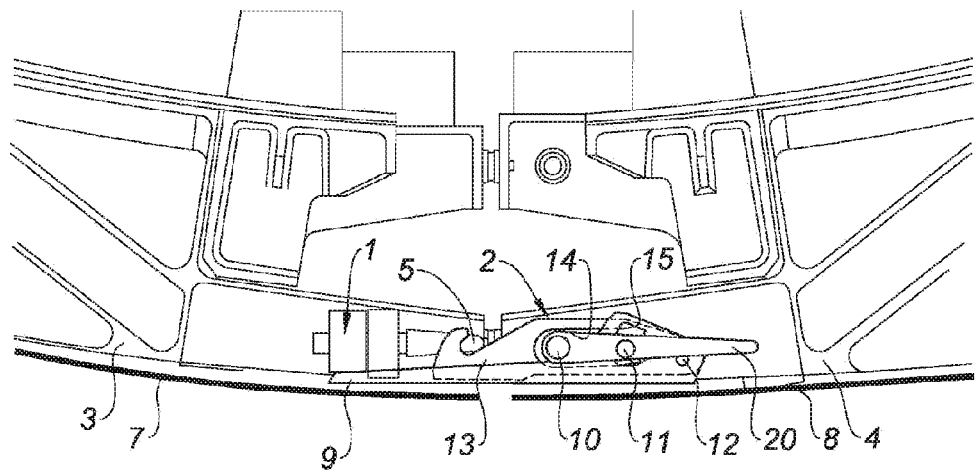
FIG. 6 is a schematic sectional view of the part of an open nacelle in a closing state thereof in which a locking member is in a retracted position according to a first form of the present disclosure.

On FIGS. 6 to 9, it has been represented a first form of the locking member according to the present disclosure. On FIG. 6, it has been represented the lock with the locking member 20 thereof in retracted or inactive position. FIG. 6 represents the same closed state of the nacelle as that of FIG. 1 and the lock is identical to that of FIGS. 1-5, except for the locking member 20.

Figure 7:
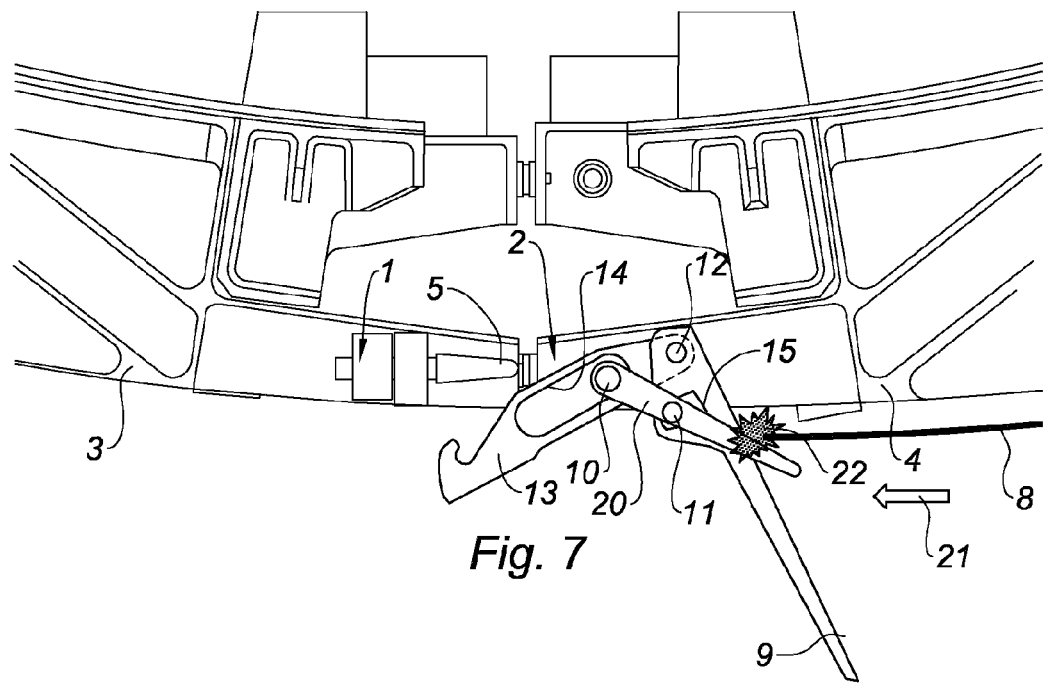
FIG. 7 is a schematic sectional view of the part of an open nacelle in an open state when one half cowl of the nacelle intercepts either the locking member or a lever cooperating with a lock in the first form of the present disclosure.

On FIG. 7, the nacelle is in the open state already represented for the state of the technique on FIG. 2. If, the maintenance operator, has forgotten to operate the stick or lever 9, he/she operates the first annular half of the cowl 8, in a closing movement 21, the free edge of the latter intercepts the lever 9 or the locking member in 22.

The locking member of this first form is constituted by an extension of the stick 16 (FIG. 3) of the lock of the state of the technique (FIGS. 1-5) in order to form a part 20 which takes with the stick or lever 9 the shape of scissors. The stick 20 carries the two pivots 10 and 11 which were mounted on the lever 16 (FIG. 3).

Figure 8:
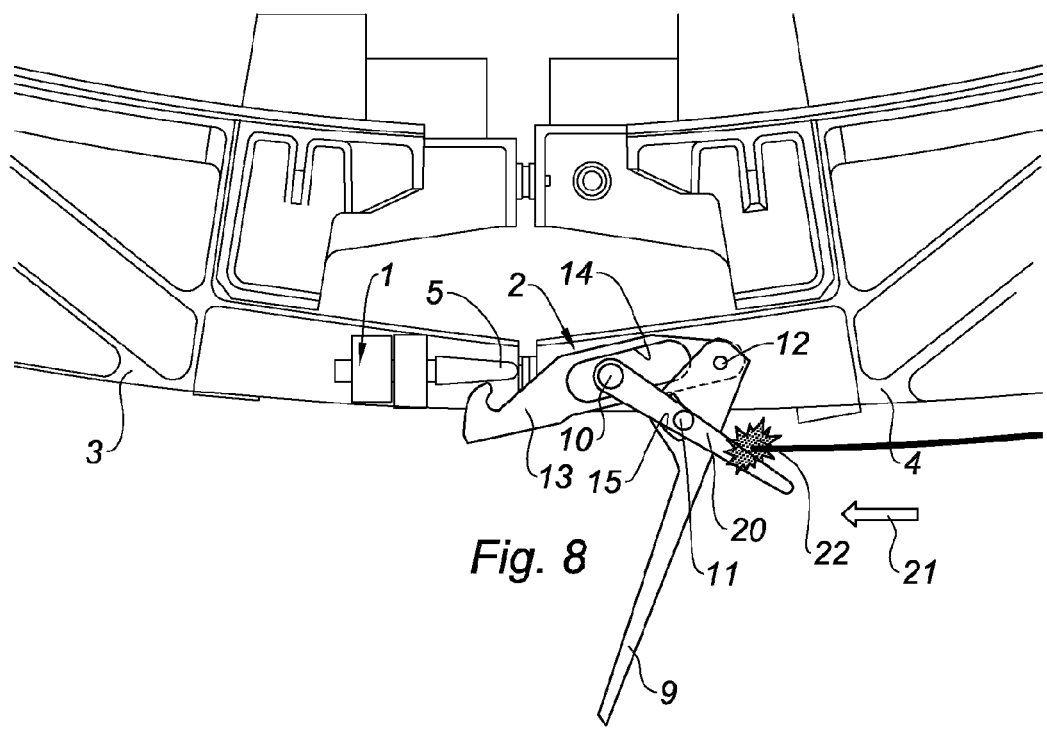
FIG. 8 is a schematic sectional view of the part of an open nacelle where the movement of the half cowl is limited by the lever and the locking member according to the first form of the present disclosure.

On FIG. 8, the movement 21 is pursued in such a manner that the stick or lever 9 pursues the rotation thereof around the axis 12 up to a point of equilibrium where the free edge of the first half 8 of the cowl reaches in the dihedral formed by the intersection of the sticks 9 and 20. The closing movement 21 of the annular half 8 of the cowl is hence locked.

The maintenance operator is thus warned as he/she can no longer finish his/her closing movement. He/she needs to reopen the half 8 of the cowl, operates the lever 9 until the end of travel of the bolting and finally resume the normal closing sequence of the cowl.

On FIGS. 9 to 12, it has been represented a second form of a member for locking the closing movement of the annular half of the cowl or one half of the cowl which is thus only possible when the locking member is retracted or rendered inactive because the lever 9 has been correctly closed in bolted position.

Figure 9:
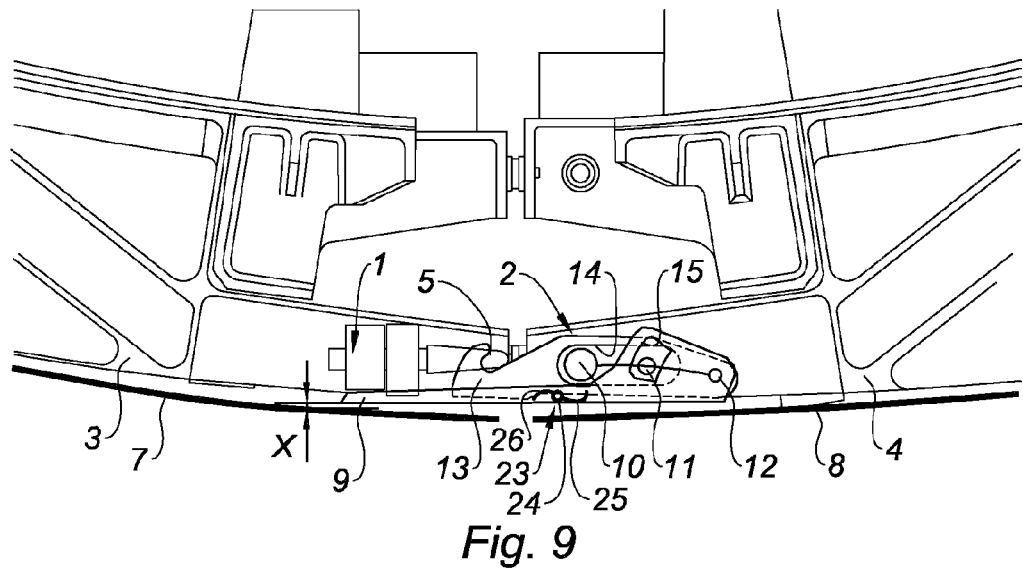
FIG. 9 is a schematic sectional view of the part of an open nacelle in a closing state in which a locking member is in a retracted position according to a second form of the present disclosure.

On FIG. 9, it has been represented the lock with the locking member 20 thereof in a retracted or inactive position. FIG. 9 represents the same closed state of the nacelle as that of FIG. 1 and the lock is identical to that of FIGS. 1-5, except for the locking member 23.

The locking member of this second form is constituted by a piece composed of a rotational axis 24 returned by a spring correctly disposed in a retracted position when the stick or lever 9 has been correctly operated at the end of travel of the bolting by a maintenance operator. The piece 23 then includes two symmetrical parts around the axis 24, each symmetrical part being in the shape of a cup or a hollow shape, 25 or 26.

Figure 10:
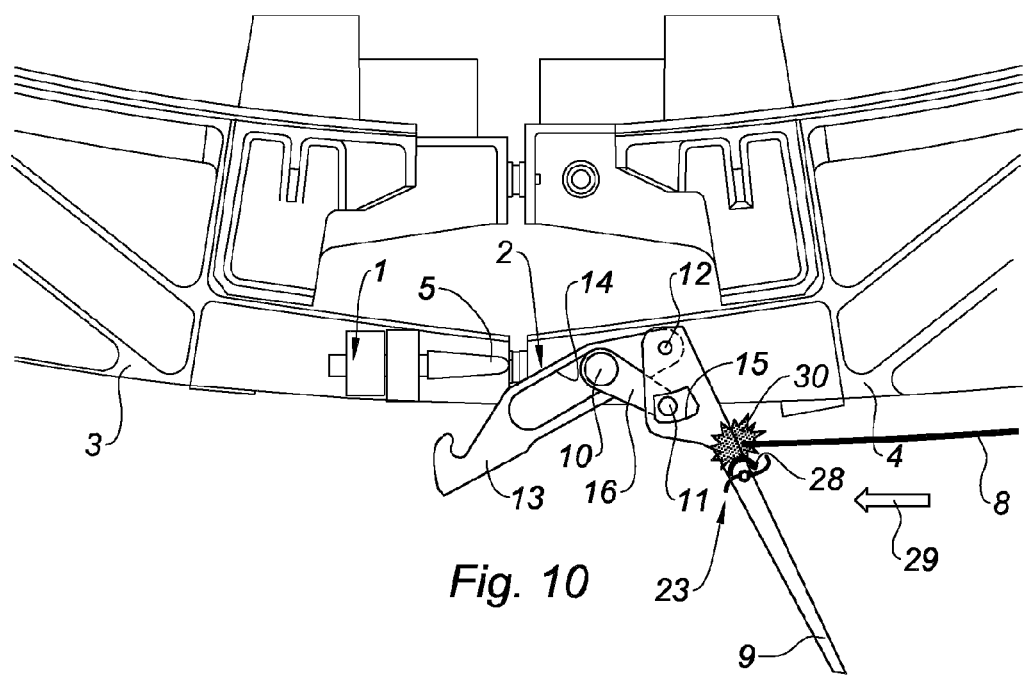
FIG. 10 is a schematic sectional view of the part of an open nacelle in an open state where the locking member is in an active position according to the second form of the present disclosure.

On FIG. 10, the nacelle is in the open state already represented for the state of the technique on FIG. 2. If, the maintenance operator has forgotten to operate the stick or lever 9 and operates the first annular half of the cowl 8, in a closing movement 29, the free edge of the latter intercepts the stick or lever 9 in 30. It is to be noted that the return spring (not represented) associated with the axis 24 of the locking member 23, mounted on the stick or lever 9, has allowed the rotation 28 of the two cups 25 and 26 mounted symmetrically on the axis 24. The result is that the locking member 23 is thus in active position by protruding beyond the surface of the stick or lever 9.

Figure 11:
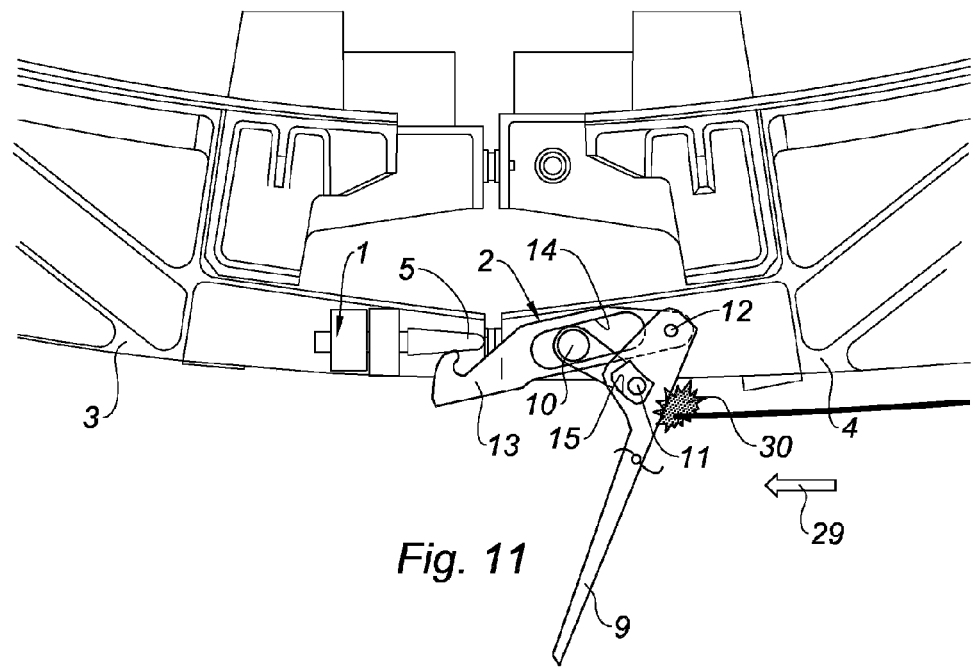
FIG. 11 is a schematic sectional view of the part of an open nacelle of which one half cowl pushes back the lever towards a closing position.

When the movement 29 of the annular half 8 of the cowl is pursued by the maintenance operator, the stick or lever 9 is pushed back towards its closed position whereas the free edge of the annular half 8 of the cowl slides in 30 along the stick 9 (see FIG. 11).

Figure 12:
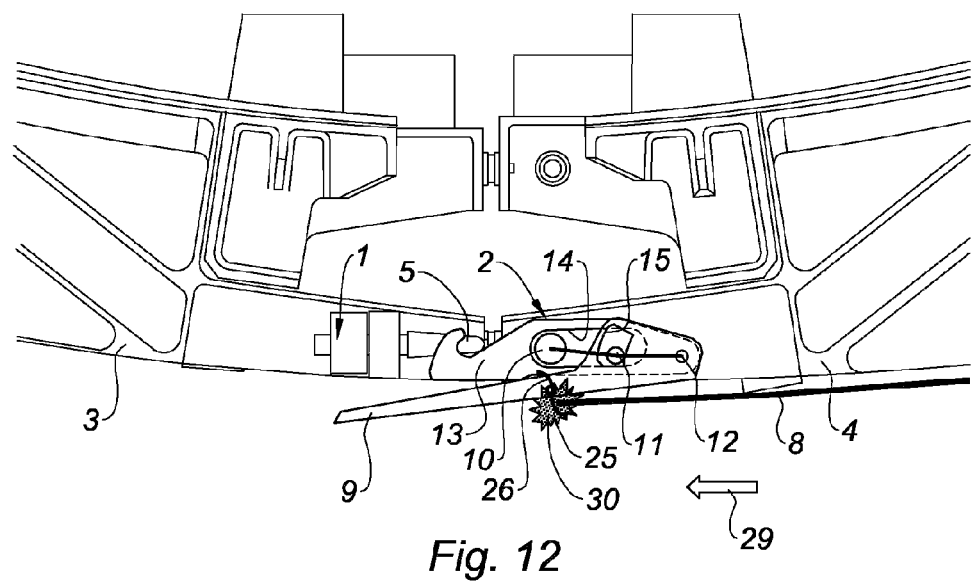
FIG. 12 is a schematic sectional view of the part of an open nacelle where the movement of the half cowl is inhibited by the locking member according to the second form of the present disclosure.

On FIG. 12, the free edge of the annular half 8 of the cowl finishes the sliding thereof in 30 along the stick 9 when it penetrates into the cup 25 of the locking member 23. The result is that the closing of the cowl is impossible, thus warning the maintenance operator.

When the maintenance operator has raised the locked half of the cowl, he/she can operate the stick 9 to the locking position thereof. In the movement, the cup 26 meets a surface disposed for this purpose on the stationary part of the bolt 2 secured to the annular half 4 of the service structure. The stationary surface is configured for receiving the cup 26 and makes the locking member 23 revolve around the axis 24 thereof in a retracted or inactive position. Back to the state represented on FIG. 9. In the same movement, the return spring (not represented) of the axis 24 is reloaded.

Other dispositions are possible, and in particular other types of locks are possible. The locking member prevents the end of the closing movement of the nacelle cowl.

What is claimed is:

1. A turbojet engine nacelle including a cowl containing a service structure and a turbojet engine, the cowl and the service structure of generally annular shapes being hinged on axes in respective halves to be opened during maintenance and closed in operating state, a first annular half of the service structure carrying a strike and a second annular half of the service structure carrying a moveable bolt on a lever, in such a manner that said strike, said bolt, and said lever constitute a lock for closing the service structure, wherein the lever cooperates with a member, the member preventing movement of a free edge of one half of the cowl when the lever is not in its normal closed position, and the member allowing closing of said half of the cowl when the lever is in its normal closed position.

2. The nacelle according to claim 1, wherein the locking member includes a stick aligned with the lever when the lever is in a closed position of the lock and forming with the member scissors to intercept the free edge of the one half of the cowl in such a manner as to prevent movement of the one half of the cowl when the lever is not in the closed position of the lock.

3. The nacelle according to claim 2, wherein the stick is hinged by a pivot on the lever.

4. The nacelle according to claim 3, wherein the stick defines ends, and one of the ends of the stick for locking the free edge of the cowl carries a pivot sliding in a housing of a moveable hook of the movable bolt hinged on a rotational axis of the lever.

5. The nacelle according to claim 1, wherein the member includes a locking piece composed of at least one cup, hinged on an axis mounted on the lever, said at least one cup being returned by a return spring in a retracted position along the lever when the lever is in the closed position of the lock and being in a protruding position on the lever when the lever is in an open position of the lock, in such a manner as to intercept the free edge of the one half of the cowl in such a manner as to prevent movement of the one half of the cowl when the lever is not in the closed position of the lock.

6. The nacelle according to claim 5, wherein the locking piece includes a symmetrical part of the cup intended to come in contact with a surface on a stationary part of the bolt secured to the annular half of the service structure, the locking piece configured to receive the stationary part and make the locking member revolve around an axis of the locking piece in retracted or inactive positions and so that the return spring of the axis can be reloaded.

* * * * *